(12) United States Patent
Sabbah et al.

(10) Patent No.: US 11,182,837 B2
(45) Date of Patent: Nov. 23, 2021

(54) SYSTEM AND METHOD FOR AUTOMATICALLY GENERATING A NEW PORTION OF A PHOTO PRODUCT DESIGN BASED ON USER INPUT PORTION

(71) Applicant: Shutterfly, LLC, Redwood City, CA (US)

(72) Inventors: Yohann Sabbah, Haifa (IL); Eran Cohen, Atlit (IL); Elias Yossef, Kiryat Tivon (IL)

(73) Assignee: Shutterfly, LLC, Redwood City, CA (US)

( * ) Notice: Subject to any disclaimer, the term of this patent is extended or adjusted under 35 U.S.C. 154(b) by 303 days.

(21) Appl. No.: 15/810,373

(22) Filed: Nov. 13, 2017

(65) Prior Publication Data
US 2019/0066178 A1 Feb. 28, 2019

Related U.S. Application Data

(60) Provisional application No. 62/549,889, filed on Aug. 24, 2017.

(51) Int. Cl.
| | |
|---|---|
| *G06Q 30/00* | (2012.01) |
| *G06Q 30/06* | (2012.01) |
| *G06N 20/00* | (2019.01) |
| *G06T 11/60* | (2006.01) |
| *G06T 11/00* | (2006.01) |

(52) U.S. Cl.
CPC ......... *G06Q 30/0621* (2013.01); *G06N 20/00* (2019.01); *G06Q 30/0643* (2013.01); *G06T 11/00* (2013.01); *G06T 11/60* (2013.01)

(58) Field of Classification Search
CPC .......... G06Q 30/0621; G06Q 30/0643; G06N 20/00; H04N 1/00132; H04N 1/0019; H04N 1/00196
See application file for complete search history.

(56) References Cited

U.S. PATENT DOCUMENTS

| | | | | |
|---|---|---|---|---|
| 8,363,888 B2 * | 1/2013 | Chen | ................. | H04N 1/00196 382/100 |
| 8,923,551 B1 * | 12/2014 | Grosz | ................ | H04N 1/00196 382/100 |
| 8,958,662 B1 * | 2/2015 | Grosz | ................. | H04N 21/854 382/305 |
| 9,219,830 B1 * | 12/2015 | Ciorba | ............... | H04N 1/00164 |

(Continued)

OTHER PUBLICATIONS https://www.techradar.com/news/google-photos-can-now-automatically-design-a-physical-photo-book-for-you (May 17, 2017) (Year: 2017).*

*Primary Examiner* — Matthew E Zimmerman
(74) *Attorney, Agent, or Firm* — Merchant & Gould P.C.

(57) ABSTRACT

A computer-implemented method for creating a photo product design with minimal user inputs includes generating a first portion of a photo product design by a product design module in response to user input, determining one or more layout parameters from the user input to the first portion of the photo product design by a user design learning module, automatically creating a second portion of the photo product design by an intelligent product creation engine at least in part in response to the one or more layout parameters, and automatically making a physical photo product based on at least the first portion and the second portion of the photo product design.

21 Claims, 8 Drawing Sheets

(56) References Cited

U.S. PATENT DOCUMENTS

| | | | |
|---|---|---|---|
| 2011/0213795 A1* | 9/2011 | Lee | G06F 16/51 |
| | | | 707/769 |
| 2011/0280476 A1* | 11/2011 | Berger | H04N 1/00196 |
| | | | 382/163 |
| 2012/0011021 A1* | 1/2012 | Wang | G06Q 10/10 |
| | | | 705/26.5 |
| 2012/0082401 A1* | 4/2012 | Berger | G06F 16/5866 |
| | | | 382/306 |
| 2012/0294514 A1* | 11/2012 | Saunders | G06K 9/00677 |
| | | | 382/159 |
| 2013/0051684 A1* | 2/2013 | Chen | H04N 1/00137 |
| | | | 382/209 |
| 2014/0092424 A1* | 4/2014 | Grosz | G06F 3/04845 |
| | | | 358/1.15 |
| 2014/0195921 A1* | 7/2014 | Grosz | G06Q 30/0601 |
| | | | 715/738 |
| 2015/0189107 A1* | 7/2015 | Murata | H04N 1/387 |
| | | | 345/629 |
| 2017/0032443 A1* | 2/2017 | Nakashima | G06F 3/14 |

* cited by examiner

SYSTEM AND METHOD FOR AUTOMATICALLY GENERATING A NEW PORTION OF A PHOTO PRODUCT DESIGN BASED ON USER INPUT PORTION

TECHNICAL FIELD

This application relates to digital imaging technologies and photo products, and in particular, to technologies that can enable photo product designs with minimal user input.

BACKGROUND OF THE INVENTION

With the advancement of consumer electronic devices, a vast number of pictures are taken by mobile devices and digital cameras. Digital images can be incorporated into product designs for products such as photo books, photo calendars, photo greeting cards, posters, photo décor, photo mugs, photo T-shirts, photo magnets, photo coasters, photo aprons, and so on.

A photo product can include one or more pages and involve many design elements. Designing a photo product can include many iterative steps such as selecting an overall style, selecting suitable images, selecting a layout for each page, assigning images to each page, inputting text, adding embellishments, rearranging pages, the images and the text. The product creation process can be quite time consuming. Increasingly, photo products are designed using mobile devices.

There continues to be a need for a method to enable users to design photo products in a convenient and time efficient manner.

SUMMARY OF THE INVENTION

The present application discloses system and method that can significantly enhance users' experiences associated with designing personalized photo products. Automated tools have been developed to automatically increasing or finish up the design of a photo product after a user has provided input to a portion of the photo product design. An advantageous feature of the presently disclosed invention is that while a user remains in control of design elements he or she prefers to have in a photo product, but the amount of time and effort spent by users are minimized.

In another perspective, a semi-manual and semi-automatic method is provided to leverage both sophisticated automated product design capabilities and the knowledge of user's preferences to make each design iteration efficient. A user design learning module automatically determines the event, the product style, and the page layout from the user input to a portion of a photo product. Based on the learning by the user design learning module, an intelligent product design module automatically creates the rest of the photo product design without taking additional effort from the user.

In one general aspect, the present invention relates to a computer-implemented method for creating a photo product design with minimal user inputs, including: generating a first portion of a photo product design by a product design module in response to user input; determining one or more layout parameters from the user input to the first portion of the photo product design by a user design learning module; automatically creating a second portion of the photo product design by an intelligent product creation engine at least in part in response to the one or more layout parameters, wherein the product design module, the user design learning module, and the intelligent product creation engine are in communication in a computer system; and automatically making a physical photo product based on at least the first portion and the second portion of the photo product design.

Implementations of the system may include one or more of the following. The computer-implemented method can further include: automatically determining one or more style parameters from the user input to the first portion of the photo product design by the user design learning module; and automatically creating the second portion of the photo product design by the intelligent product creation engine at least in part in response to the one or more style parameters. The one or more style parameters can include a background pattern, a background photo, a background color, an embellishment, or a tilt angle of a photos or a photo well. The one or more style parameters can include a curation level that relates to a degree of selection of photos in a photo collection. The one or more style parameters can include a level of design in the photo product design. The one or more layout parameters can include a density, sizes, or positions of photos on a page. The one or more layout parameters can include gaps between photos or the margins between photos and the edges of a page. The one or more layout parameters can include presence or absence, positions sizes, or font types of text. The computer-implemented method can further include automatically determining an event associated with the photo product design from the user input to the first portion of the photo product design by the user design learning module; and automatically creating the second portion of the photo product design by the intelligent product creation engine at least in part in accordance to the event. The computer-implemented method can further include automatically selecting photos incorporated in the second portion of the photo product design by the intelligent product creation engine at least in part in accordance to the event. The computer-implemented method can further include receiving user's edit command to or user selection in the second portion of the photo product design by the product design module; and automatically creating a third portion of the photo product design by the intelligent product creation engine based on the user's edit commands to or user's selection in the second portion of the photo product design. The first portion can include one or more pages in the photo product, wherein the second portion comprises one or more pages in the photo product. The first portion can include a portion of a page in the photo product.

In another general aspect, the present invention relates to a photo product design smart assistant system for creating a photo product design with minimal user inputs, includes: a product design module that can generate a first portion of a photo product design by a product design module in response to user input; a user design learning module that can determine one or more layout parameters from the user input to the first portion of the photo product design by a user design learning module; an intelligent product design creation engine that can automatically create a second portion of the photo product design by an intelligent product creation engine at least in part in response to the one or more layout parameters, wherein the product design module, the user design learning module, and the intelligent product creation engine are in communication with each other; and a printing and finishing facility that can make a physical photo product based on at least the first portion and the second portion of the photo product design.

These and other aspects, their implementations and other features are described in detail in the drawings, the description and the claims.

DETAILED DESCRIPTION OF THE INVENTION

Figure 1:
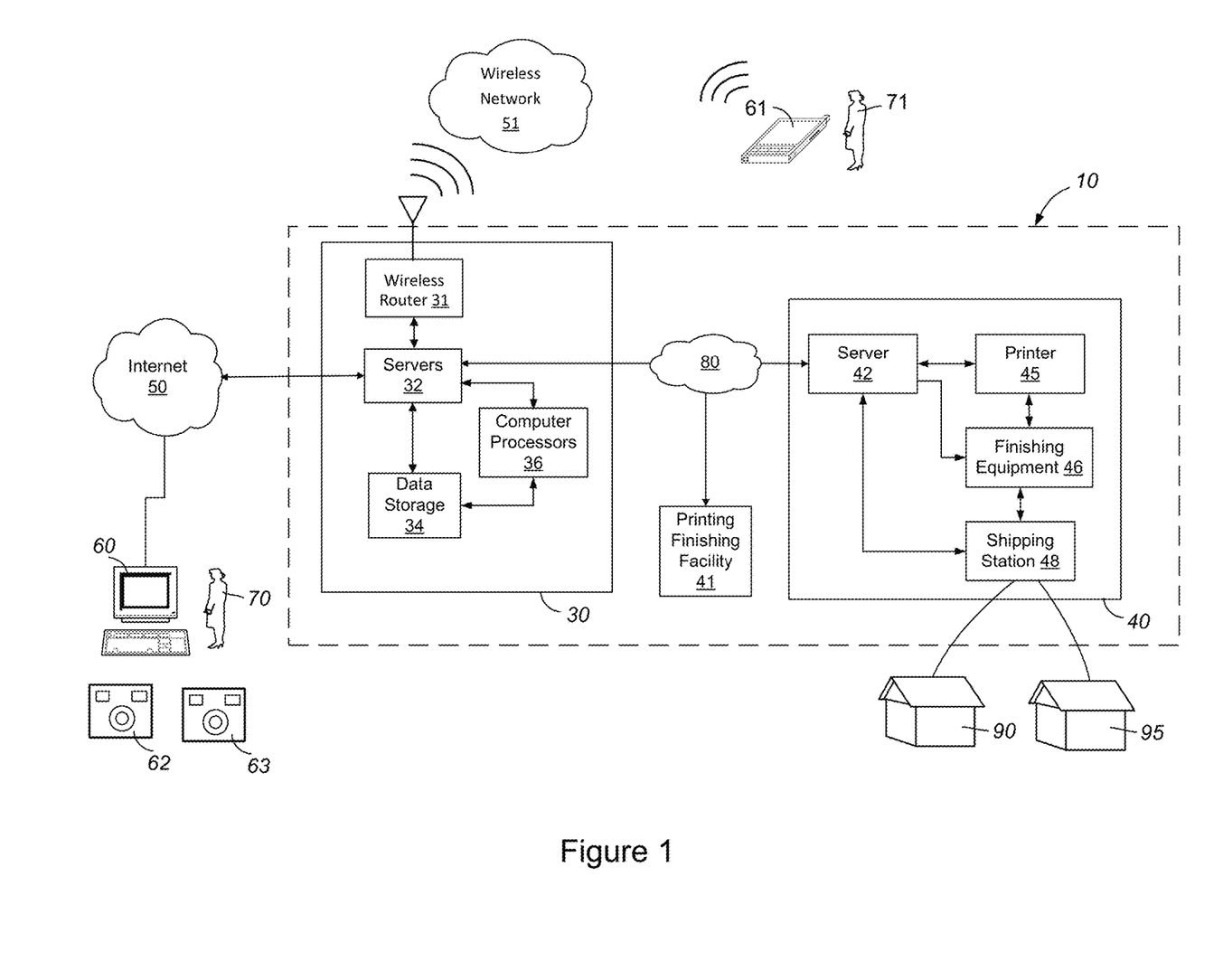
FIG. 1 is a block diagram of a network-based system for creating personalized photo product designs and making associated photo products in accordance with the present invention.

Referring to FIG. 1, a network-based imaging service system 10, which can be operated by an image service provider such as Shutterfly, Inc., includes a data center 30 and one or more product fulfillment centers 40, 41 in communication with the data center 30 over a computer network 80. The network-based imaging service system 10 allows users 70, 71 to organize and share images via a wired network or a wireless network 51, create photo product designs, and order personalized photo products. The product fulfillment centers 40, 41 can fulfill the ordered photo products.

The data center 30 includes one or more servers 32 configured to communicate with user devices (60, 61) operated by users 70, 71 on the web or via mobile applications, a data storage 34 for storing user data, image and design data, and product information, and computer processor(s) 36 for rendering images and product designs, analyzing and organizing images, and analyzing and understanding user behaviors and preferences. The user data includes account information, discount information, order information, relationship, and important dates associated with each user.

The users 70, 71 can view, edit, organize, and share images, and create designs and order personalized photo products using a mobile application or a browser by accessing the website. Images can also be uploaded from the mobile device 61 or the computer device 60 to the server 32 to allow the user 70 and stored at the data center 30. The images or videos stored in the data storage 34, the computer device 60, or the mobile device 61 usually include groups of photos or videos taken at different events and occasions. If users 70, 71 are members of a family or a group (e.g. a soccer team), the images from the cameras 62, 63 and the mobile device 61 can be grouped together to be incorporated into a photo product such as a photobook, or used in a blog page for an event such as a soccer game.

The users 70, 71 can order physical products based on the photo product designs, which can be manufactured by the printing and finishing facilities 40 and 41. The recipients receive the physical product with messages from the users at locations 90, 95. The recipients can also receive digital versions of the photo product designs over the Internet 50 and/or a wireless network 51.

The printing and finishing facilities 40, 41 can include one or more printers 45 for printing images, finishing equipment 46 for operations such as cutting, folding, binding the printed image sheets, and shipping stations 48 for verifying the orders and shipping the orders to recipients 90 and 95. Examples of the printers 45 include can be digital photographic printers, offset digital printers, digital printing presses, and inkjet printers. The finishing equipment 46 can perform operations for finishing a complete image-based product other than printing, for example, cutting, folding, adding a cover to photo book, punching, stapling, gluing, binding, and envelope printing and sealing. The shipping stations 48 may perform tasks such as consolidating packages, packaging, labeling, package weighing, and postage metering.

In the present disclosure, the term "personalized" (or "individualized" or "customized") refers to content such as photos, text, design elements, layouts, or styles that is specific to a user, a recipient, a gift product, or an occasion. A photo product can include a single page or multiple pages. Each page can include one or more images, text, and design elements positioned in proportions in a particular layout. Examples of personalized photo products include photobooks, personalized greeting cards, photo stationeries, photographic prints, photo posters and photo banners, photo banners, photos on canvas, art prints, framed prints, photo décor, duvet, photo bags, photo playing cards, photo T-shirts, photo mugs, photo aprons, photo magnets, photo mouse pads, photo phone cases, tablet computer cases, photo key-chains, photo collectors, photo coasters, or other types of photo gifts or novelty items. Photobooks can be in the forms of image albums, scrapbooks, bound photo calendars, or photo snap books, etc.

Figure 2:
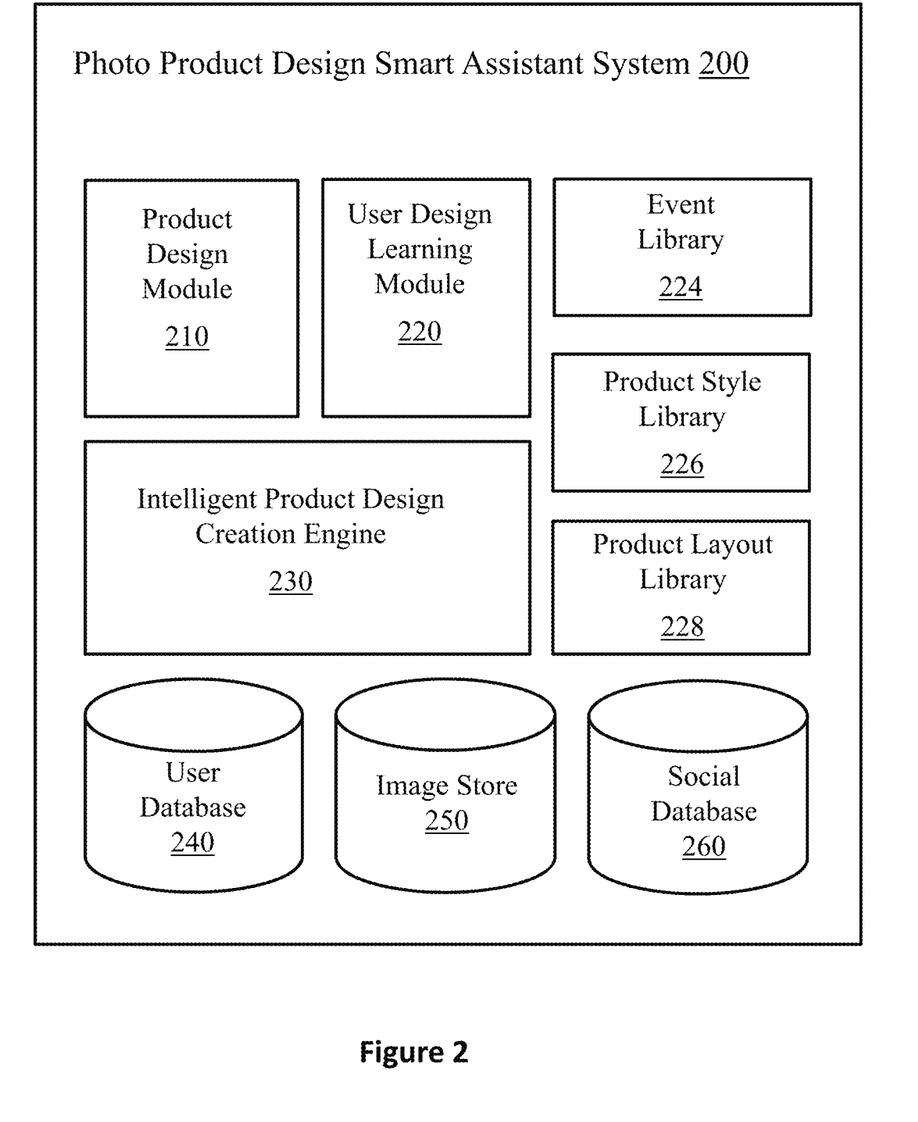
FIG. 2 is a block diagram of a smart assistant system for assisting users in creating photo product designs in accordance with some embodiments of the present invention.

In some embodiments, referring to FIGS. 1 and 2, a photo product design smart assistant system 200 is provided to save users' time and effort in creating photo product designs to better preserve memories and tell stories. The photo product design smart assistant system 200 includes a product design module 210, a user design learning module 220, and an intelligent product design creation engine 230. The product design module 210 takes input form a user to put together design elements of a photo product. The user design learning module 220 learns the user input and identifies user intention, patterns and themes such as the event the photo product is about, product style parameters, product layout parameters, etc. The intelligent product design creation engine 230 can automatically create a new portion of a photo product design, or automatically finish a partial photo product design in response to the learning by the user design learning module 220. The photo product design smart assistant system 200 also includes an event library 224, a product style library 226, and a product layout library 228, which respectively stores types of events, product styles, and product layouts for personalized photo products and for electronic shares.

The photo design smart assistant system 200 can be implemented the components in the data center 30 shown in FIG. 1 and may employ distributed computing equipment. In some embodiments, the photo design smart assistant system 200 can be implemented in the cloud or with dedicated physical network equipment.

Examples of the types of events include birthday parties, anniversaries, graduations, trips, vacations, sports games, charity events, corporate events, and so on. Another type of event may include a period of time such as Year 2016, Melissa from 1 to 18 years old. Events can be defined and stored in the event library 224. Events can also be related to time, location, keyword, the title of a photo album, text caption, and other metadata stored in association with the photos in the image store 250, and information stored in the user database 240 and the social database 260, which can be learned by the user design learning module 220. The user design learning module 220 can also detect event types from the content of the photos. For example, the user design learning module 220 can identify a birthday cake or a soccer ball in photos to interpret a birthday party and a soccer game as a result.

Product styles and product layouts include lists of pre-stored styles and layouts, and can also include those styles and layouts that are dynamically generated by the photo product design smart assistant system 200.

In the present disclosure, "product style" refers to product style parameters such as a background pattern, a background photo, or a background color, embellishments, tilt angles of the photos or photo wells, the color scheme, or other design themes, characteristics, topics or elements of a photo product. For photo products, product style parameters also include the level of designs and curation levels. The level of designs refers to the extra design elements beyond photos incorporated in a photo product. For example, at a low level of design, a photo book may include mostly pictures and not much other design elements (e.g. a plain photo book or photo card). The curation level refers to the degree of selection and trimming of available photos in a photo collection related to the photo product. At a low curation level, all or most of the photos taken at an event can be used in a photo product such as a photo book. At a high curation level, only a small fraction of photos taken at an event are selected to be incorporated by a photo product. Sometimes a set of style parameters can be formulated together to present a theme such as fun, summer, modern, romantic, etc. Product style parameters are defined and stored in the product style library 226.

In the present disclosure, "product layout" (including page layout) refers to product layout parameters such as the number or the density, the sizes, the positions of photos on one or two opposing pages, the gaps between the photos, and the margins between photos and the edges of a page. The product layout parameters can also include the presence or absence of text and other design elements, positions and sizes of the text and other design elements, and font types of the text. Product layout parameters are defined and stored in the product layout library 228.

The photo product design smart assistant system 200 can also include a user database 240, an image store 250, and a social database 260. The user database 240 stores user data such as account information, discount information, and order information associated with users. The image store 250 stores users' photos or stock photos managed by the online image service provider. The social database 260 stores relationships (family members and friends) of a user, and face images and face models for the family members and the friends of the user.

The photo product design smart assistant system 200 can be formed by processors and memory on a user device (60, 61), or servers 32 and data storage 34 in the data center 30, or a combination of the computing components on user device(s) and at the data center.

Referring next to FIGS. 1-4, a first portion of a photo product design 400 is generated at a user interface 410 in response to user input using tools provided by the product design module 210 on a computer device (e.g. 60, 61) (step 310). The first portion can be one or more pages, or a portion of a page in a photo product. A user has selected one or more photos 420 from a photo collection 430, and placed them over one or pages of the photo product design 400. The user may choose to tilt the one or more photos 420 or leave them leveled. The one or more photos 420 have certain desired density and number on the pages as designed by the user. Gaps between the photos 420 and the margins along the page edges can also be selected by the user. The user may have selected or created a background design 440 (a color, a pattern, or a photo) suitable for the photo product design 400.

In general, the user can select photos, pick event, design elements, styles, and layouts from the image store 250, the event library 224, the product style library 226, the product layout library 228, and the social database 260. The user can also dynamically generate any of the design elements during the product design creation process.

Challenges to Photo Product Design Creation and Solution.

Figure 4:
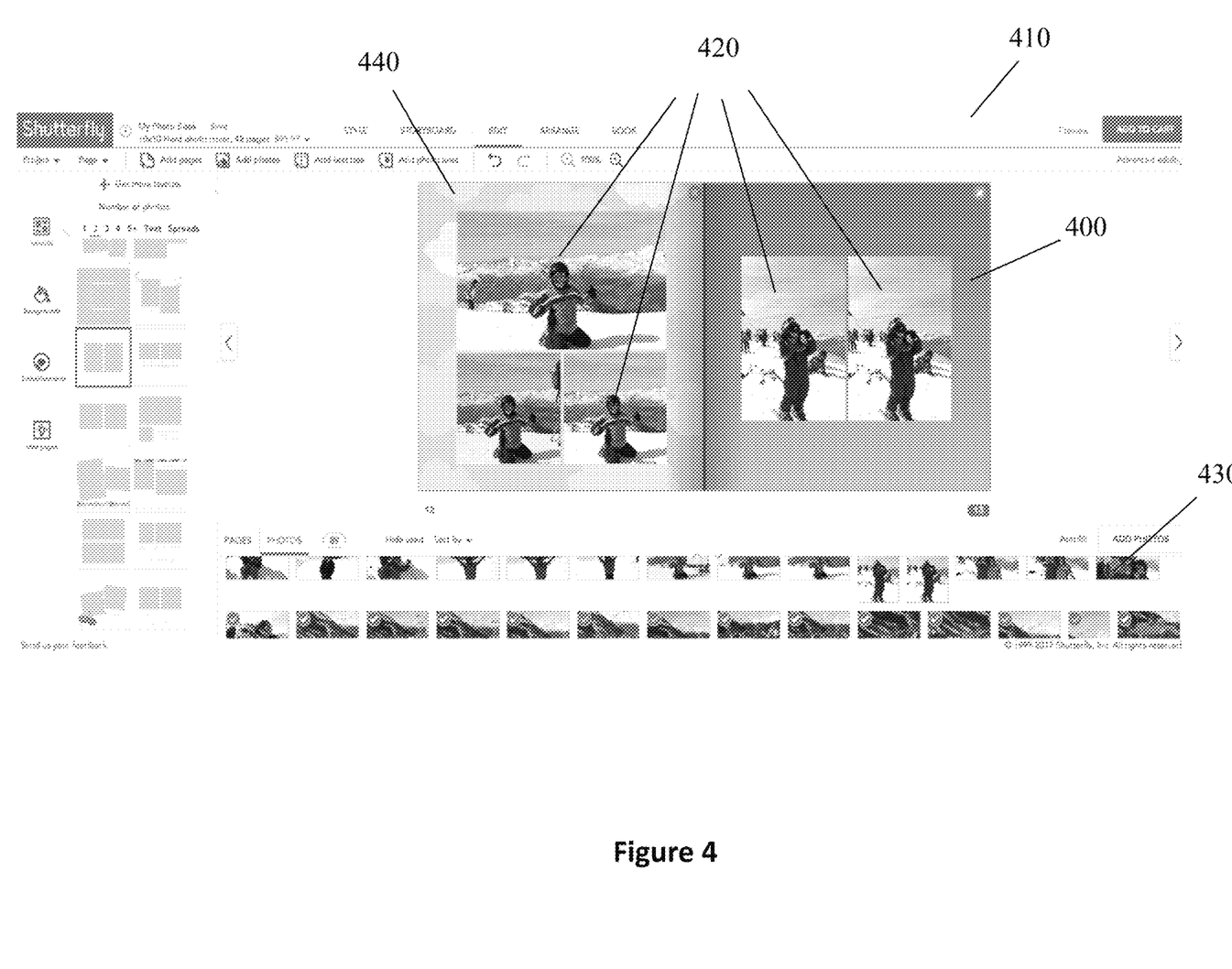
FIG. 4 illustrates user input to a portion of an exemplified photo product in accordance with some embodiments of the present invention.

It should be noted that the design and creation process of a photo product often takes a considerable period of time (often taking hours). The user may be distracted or interrupted by other daily activities during the process before a photo product design is finished. While the user has only provided input to the first portion of the photo product design 400 and the design for the rest of the photo product has not been created by the user yet, the user design learning module 220 can automatically use machine learning to understand the user's intentions from the already finished portion of the photo product.

Figure 3:
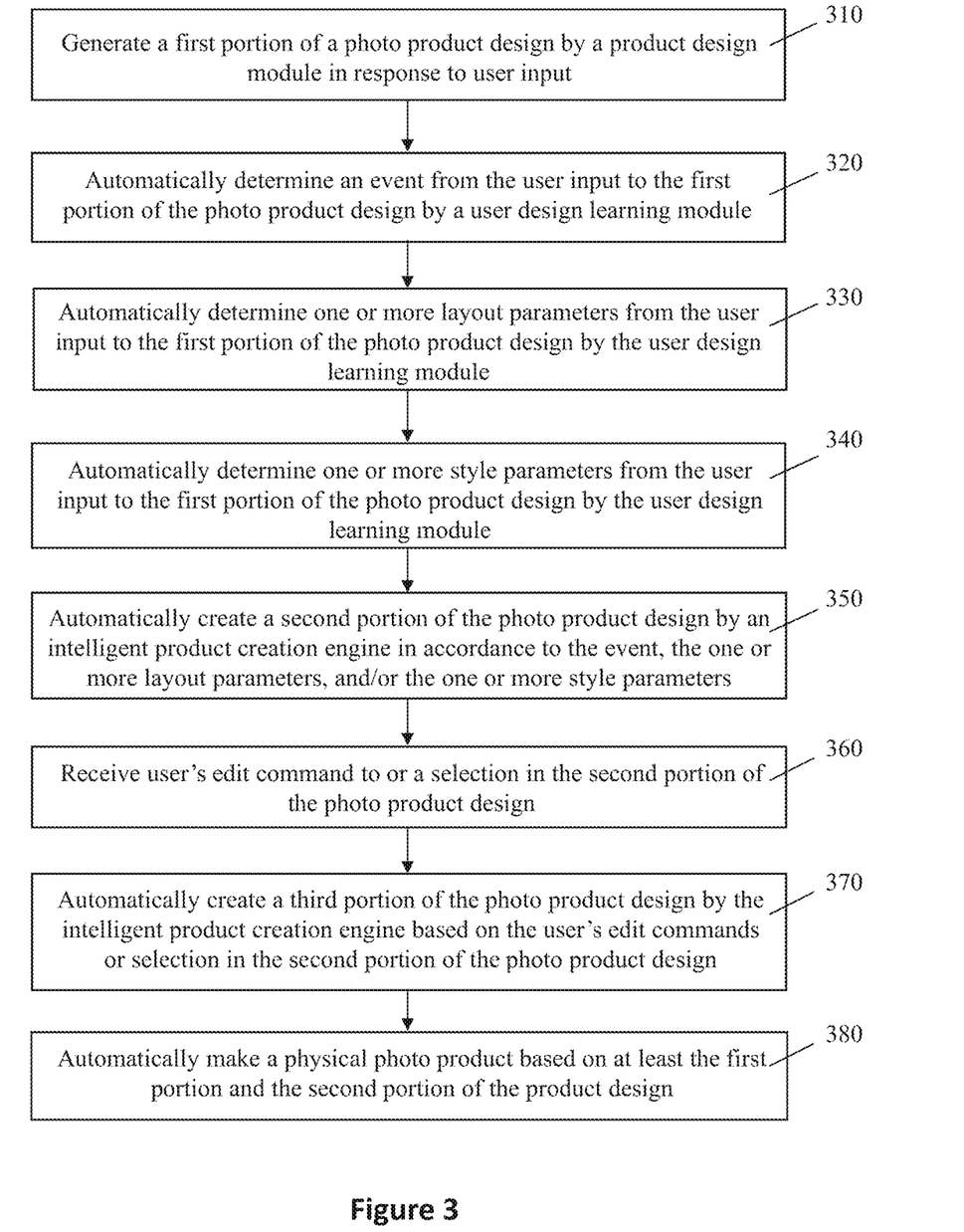
FIG. 3 is a flow diagram for automatically increasing or finishing up a photo product design based on user input to a portion of the photo product design in accordance with some embodiments of the present invention.

The user design learning module 220 can automatically determine an event from the user input to the first portion of the photo product design 400 (step 320). For example, the user design learning module 220 can automatically determine an event (e.g. a ski trip) from the content in the photos 440 (e.g. by identifying a snow field and ski gears in the pictures), or from the metadata, key words, annotation, or an album title associated with the photos 440.

The user design learning module 220 can also automatically determine one or more layout parameters from the user input to the first portion of the photo product design (step 330). The user design learning module 220 can obtain the sizes, the positions of photos, the presence or lack of text, and the font sizes and the locations of text (or captions). The user design learning module 220 can also obtain product layout parameters such as the average density and the number of photos on each page, gaps between the photos 420 and the margins along the page edges as shown in the photo product design 400.

Moreover, the user design learning module 220 can also automatically determine one or more style parameters from the user input to the first portion of the photo product design (step 340). The user design learning module 220 can obtain product style parameters such as the color, the pattern, or the background photo the background design 440 in the photo product design 400. The user design learning module 220 can determine if the photos 420 are tilted and their tilt angles. By comparing the photos 420 placed in the photo product design 400 to photos in the photo collection 430, the user design learning module 220 can determine a curation level that the user prefers for the photo product (and for the particular event), that is, the fraction of photos taken during the event that are selected to be incorporated into the photo product. The user design learning module 220 can also calculate the number of design elements (graphics, embellishments, background patterns, text, text colors, photo tilt angle, uniformity in photo dimensions, etc.) to obtain an overall level of design for the first portion of the photo product. Based on the learning about the event, product layout parameters, the product style parameters obtained by the user design learning module 220, the intelligent product creation engine 230 can a design theme (e.g. fun, summer, modern, romantic, etc.) and user's intention and design preference for the design of the particular photo product in process. To save the user's time and to provide more design options for the user, the intelligent product creation engine 230 can automatically create a second portion of the photo product design in accordance to the event, the one or more layout parameters, and/or the one or more style parameters (step 350). The second portion of the photo product design can include additional pages or portion of a page for the photo product design. The second portion, in conjunction of the first portion, can also provide a complete version for the photo product design (a full photo book, a fully design greeting card, a photo calendar with all the months finished for the period covered by the calendar). The intelligent product creation engine 230 can automatically selecting photos to incorporate in the second portion of the photo product design in part in accordance to the event identified by the user design learning module 220.

Figure 5:
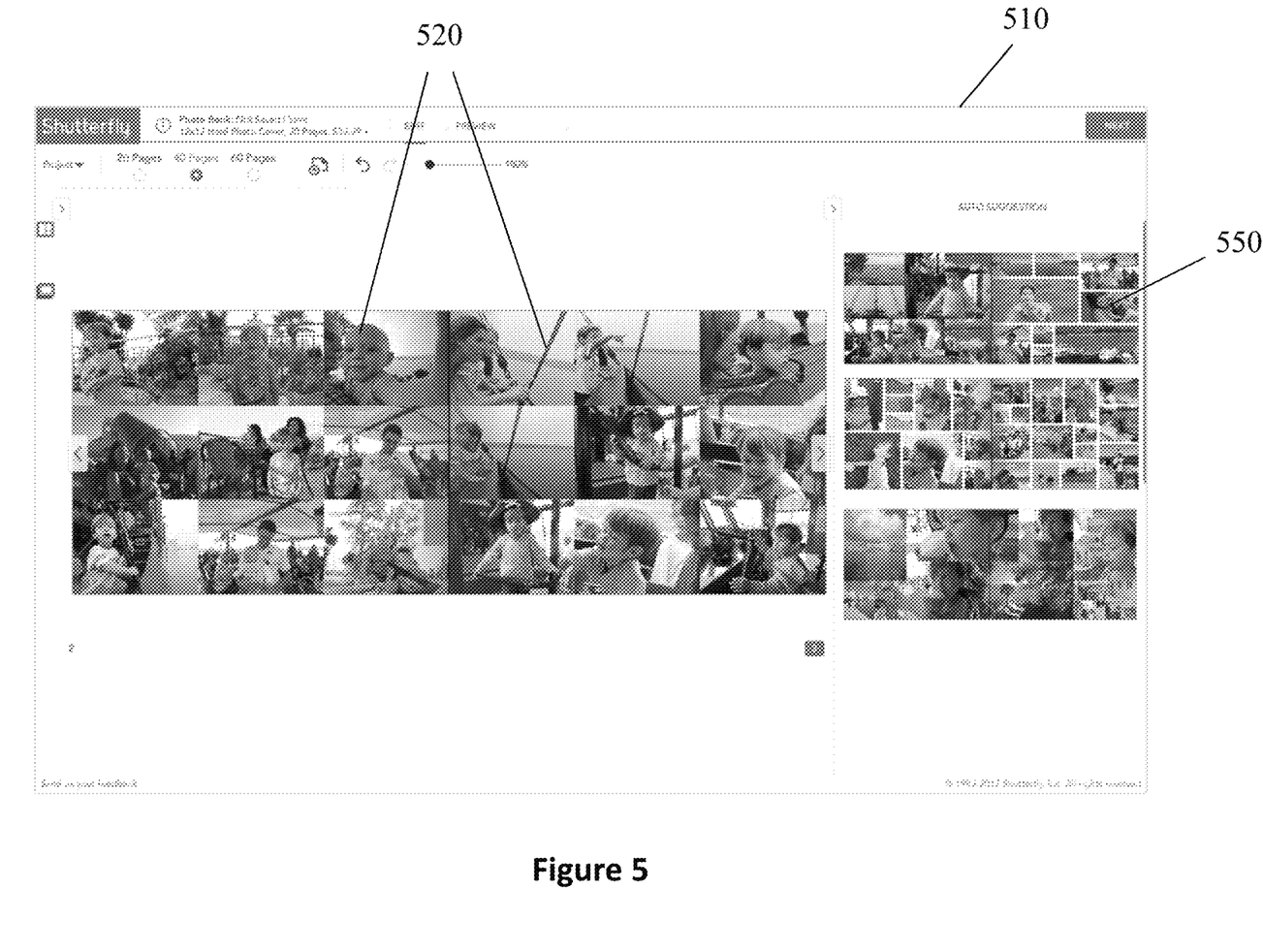
FIG. 5 illustrates an example of user input to product layout parameters in a first portion of an exemplified photo product and an automatically created second portion of the photo product in accordance with some embodiments of the present invention.

Referring to FIG. 5, at a user interface 510, a first portion 520 of a photo product design is produced by a user using tools provided by the product design module 210. Based on the learning (the number and density of photos on each page) by the user design learning module 220 from the first portion 520, the intelligent product creation engine 230 automatically creates a second portion 550 of the photo product design, which may include one or multiple pages of the photo product. In fact, the additional second portion of design may finish the photo product design (e.g. photobook) for the identified event (a vacation trip).

Figure 6:
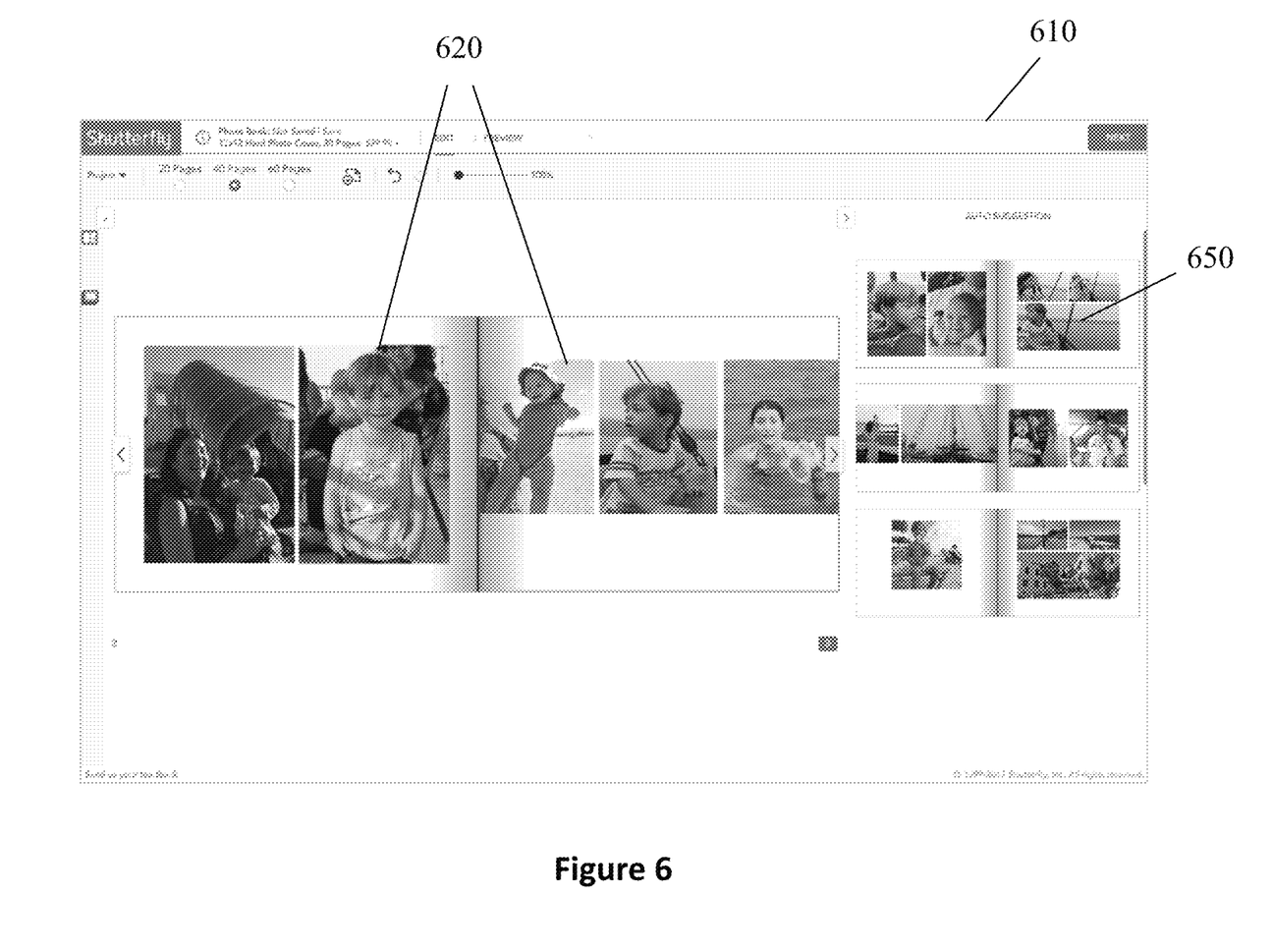
FIG. 6 illustrates another example of user input to product layout parameters in a first portion of an exemplified photo product and an automatically created a second portion of the photo product in accordance with some embodiments of the present invention.

Referring to FIG. 6, at a user interface 610, a first portion 620 of a photo product design is produced by a user using tools provided by the product design module 210. Based on the learning (the layout including gaps and margins, the style including curation level and the design level, and the presence of lack of text) by the user design learning module 220 from the first portion 620, the intelligent product creation engine 230 automatically creates a second portion 650 of the photo product design, which may include one or multiple pages of the photo product. In fact, the additional second portion of design may finish the photo product design (e.g. a photobook) for the identified event (a vacation trip).

Figure 7:
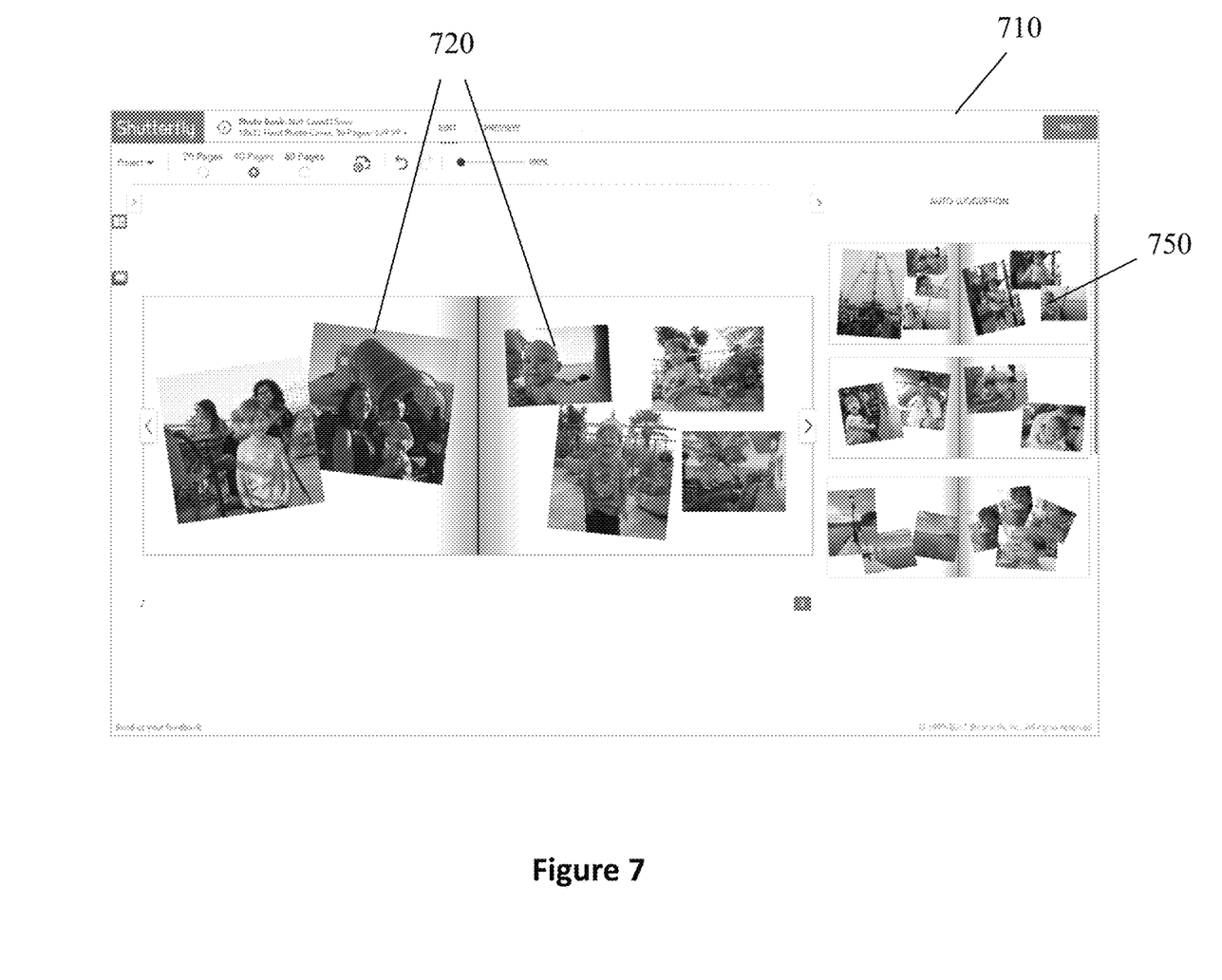
FIG. 7 illustrates another example of user input to product layout parameters in a first portion of an exemplified photo product and an automatically created a second portion of the photo product in accordance with some embodiments of the present invention.

Referring to FIG. 7, at a user interface 710, a first portion 720 of a photo product design is produced by a user using tools provided by the product design module 210. Based on the learning (the layout including gaps and margins, the number of photos per page, the style including tilt angles of the photos, and the presence of lack of text, etc.) by the user design learning module 220 from the first portion 720, the intelligent product creation engine 230 automatically creates a second portion 750 of the photo product design, which may include one or multiple pages of the photo product. In fact, the additional second portion of design may finish the photo product design (e.g. a photobook) for the identified event (a vacation trip).

Figure 8:
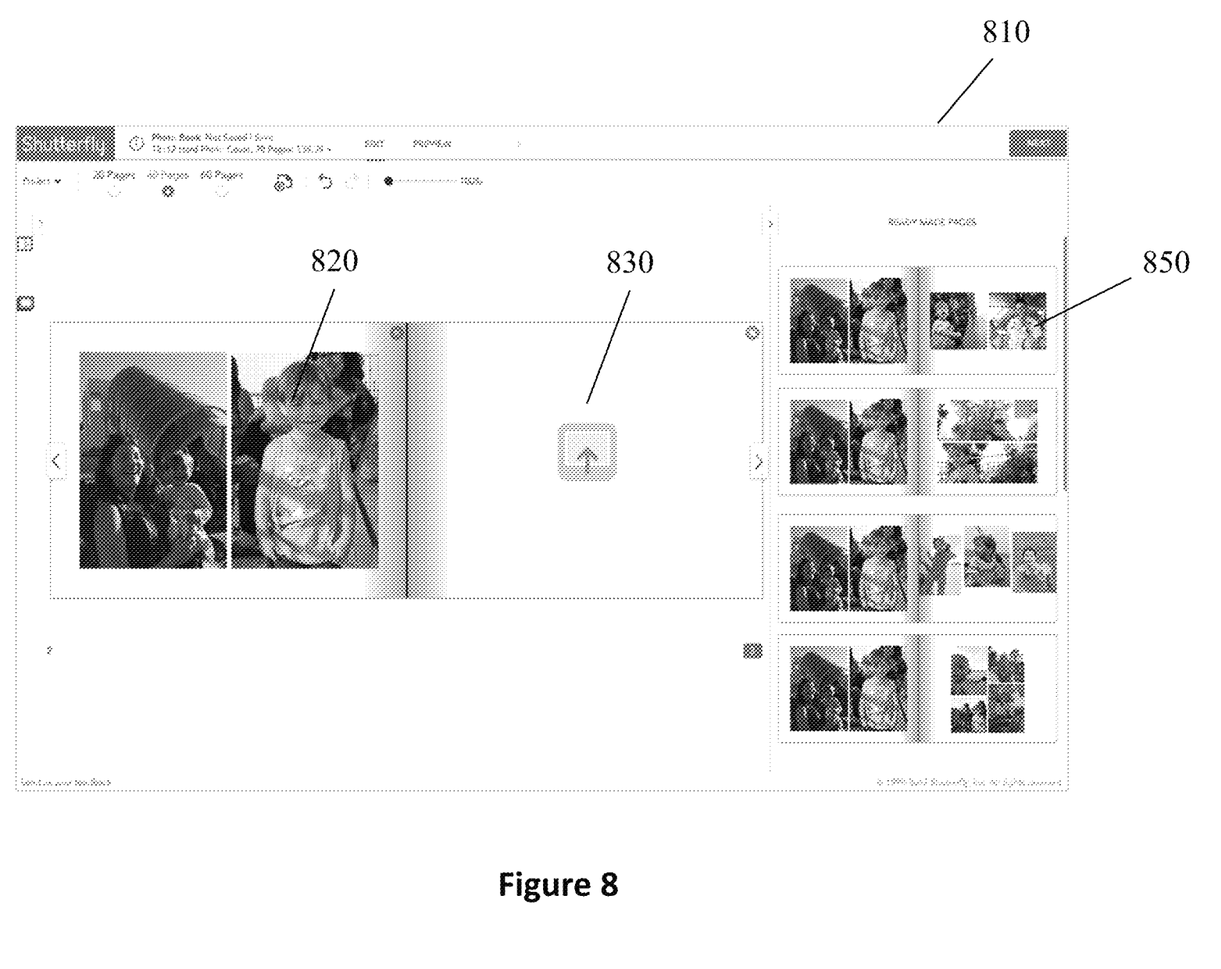
FIG. 8 illustrates an example of user input to product style parameters in a first portion of an exemplified photo product and an automatically created a second portion of the photo product in accordance with some embodiments of the present invention.

Referring to FIG. 8, at a user interface 810, a left page 820 of a photo book design is produced by a user using tools provided by the product design module 210. A right page 830 opposing the left page 820 is blank and is yet designed. Based on the learning (the product layout including gaps and margins, the product style including the curation level and the design level, and the presence of lack of text) by the user design learning module 220 from the left page 820, the intelligent product creation engine 230 automatically creates multiple design choices 850 for the right page 830.

The product design module 210 can receive user's edit command in the second portion (550, 650, 750, and 850 in FIGS. 5-8) of the photo product design (step 360). The user can also select a section or the whole of the second portion (550, 650, 750, and 850 in FIGS. 5-8) to be included in the photo product design. For example, the user can select one, a few, or all the pages (550, 650, and 750 in FIGS. 5-7) created by the intelligent product creation engine 230. The user can also select one of the design options 850 (FIG. 8) to be used for the right page 830 in the photo book design.

The user design learning module 220 can learn about additional user preferences in product layout, product style, or event from the user's edit commands or selection in the second portion of the photo product design. Based on the input, change, or selection in the second portion by the user, the intelligent product creation engine 230 can automatically create a third portion of the photo product design (step 370). For examples, after a user created designs for 1-2 pages of a photobook, the disclosed system and method can automatically learn from the first 1-2 pages and automatically create 20 additional pages for the photobook. A user is given a chance to edit the 20 additional pages. In return, the disclosed system and method can automatically learn from the first 21-22 pages and automatically create 10 more pages for the photobook, which may complete the design of the photobook. In other words, the intelligent product creation engine 230 can incrementally improve its automatically created designs from the addition user inputs in the second portion. Indeed, the user design learning module 220 and the intelligent product creation engine 230 can work in tandem to alternately improve the photo product design as the user finds more time to work on and add input to the product design.

Once a photo product design is finalized, the design can be sent to the product fulfillment centers 40, 41 (FIG. 1), wherein a physical photo product can be automatically made based on at least the first portion and the second portion of the product design (step 380).

The presently disclosed method and system can include one or more the following advantages. The disclosed system and method can significantly enhance users' experiences associated with designing personalized photo products. Automated tools have been developed to automatically increasing or finish up the design of a photo product after a user has provided input to a portion of the photo product design. An advantageous feature of the presently disclosed invention is that while a user remains in control of design elements he or she prefers to have in a photo product, but the amount of time and effort spent by users are minimized.

In another perspective, a semi-manual and semi-automatic method is described to leverage both sophisticated automated product design capabilities and the knowledge of user's preferences to make each design iteration efficient. A user design learning module automatically determines the event, the product style, and the page layout from the user input to a portion of a photo product. Based on the learning by the user design learning module, an intelligent product design module automatically creates the rest of the photo product design without taking additional effort from the user.

It should be understood that the presently disclosed systems and methods can be compatible with different devices or applications other than the examples described above. For example, the disclosed method is suitable for desktop, tablet computers, mobile phones and other types of network connectable computer devices. The photo products compatible with the present invention are not limited to the examples described above.

It should also be noted that the above described method and system are applicable not only to the design of physical photo products, but also to designs of photo projects such as electronically shared photo stories, posts, blogs, emails, and messages comprising photos and text.

What is claimed is:

1. A computer-implemented method for creating a photo product, comprising:
   receiving user selections of one or more photos and positions for placement of the one or more photos on a first page of a whole photo product design;
   generating, based on the received user selections, a partial photo product design of the whole photo product design that includes the first page with the one or more photos placed at the positions on the first page;
   providing the partial photo product design as machine learning input;
   automatically generating and providing as machine learning output a plurality of selectable design options for at least one other page included in a remaining photo product design of the whole photo product design, wherein each of the plurality of selectable design options has at least one of different photos and different positions for placement of photos on the other page, and the plurality of selectable design options are generated based on learning from the partial photo product design, including learning from the received user selections of the one or more photos and the positions for placement of the one or more photos on the first page;
   receiving a selection of one of the plurality of selectable design options;
   including the selected design option for the other page in the remaining photo product design of the whole photo product design; and
   automatically making a physical photo product based at least in part on the whole photo product design.

2. The computer-implemented method of claim 1, wherein the remaining photo product design comprises multiple pages.

3. The computer-implemented method of claim 1, wherein automatically generating and providing as machine learning output the plurality of selectable design options for the at least one other page included in the remaining photo product design of the whole photo product design comprises:
   automatically selecting photos to place in each of the plurality of selectable design options for the other page.

4. The computer-implemented method of claim 1, wherein the partial photo product design comprises multiple pages including the first page.

5. The computer-implemented method of claim 1, wherein the learning from the partial photo product design comprises:
   automatically determining one or more layout parameters in the partial photo product design,
   wherein the plurality of selectable design options are generated based on further learning from the one or more layout parameters.

6. The computer-implemented method of claim 5, wherein the one or more layout parameters include a density, sizes, or positions of photos on a page.

7. The computer-implemented method of claim 5, wherein the one or more layout parameters include gaps between photos or margins between photos and edges of a page.

8. The computer-implemented method of claim 5, wherein the one or more layout parameters include presence or absence, positions, sizes, or font types of text.

9. The computer-implemented method of claim 1, wherein the learning from the partial photo product design comprises:
   automatically determining one or more style parameters in the partial photo product design,
   wherein the plurality of selectable design options are generated based on further learning from the one or more style parameters.

10. The computer-implemented method of claim 9, wherein the one or more style parameters include a background pattern, a background photo, a background color, an embellishment, or a tilt angle of a photos or a photo well.

11. The computer-implemented method of claim 9, wherein the one or more style parameters include a curation level that relates to a degree of selection of photos in a photo collection.

12. The computer-implemented method of claim 9, wherein the one or more style parameters include a level of design in the partial photo product design.

13. The computer-implemented method of claim 1, wherein the learning from the partial photo product design comprises:
   automatically determining an event associated with the partial photo product design based on at least one of content in the one or more photos on the first page and metadata associated with the one or more photos on the first page,
   wherein the plurality of selectable design options are generated based on further learning from the event.

14. The computer-implemented method of claim 13, wherein automatically generating and providing as machine learning output the plurality of selectable design options for the at least one other page included in the remaining photo product design comprises:
   automatically selecting photos in part in accordance to the event to be placed in each of the plurality of selectable design options for the other page.

15. The computer-implemented method of claim 1, wherein the whole photo product design defines a photobook comprising multiple pages.

16. The computer-implemented method of claim 1, wherein the whole photo product design defines a calendar comprising multiple pages.

17. The computer-implemented method of claim 1, further comprising:
   receiving a user selection of a background for the first page, wherein the learning from the partial photo product design further includes learning from the user selection of the background.

18. The computer-implemented method of claim 1, wherein the partial photo product design includes a number and a density of the one or more photos placed at the positions on the first page,
wherein the learning from the partial photo product design further includes learning from the number and the density of the one or more photos placed at the positions on the first page.

19. The computer-implemented method of claim 1, wherein the partial photo product design includes a second page, and the computer-implemented method further comprises:
receiving additional user selections of one or more photos and positions for placement of the one or more photos on the second page; and
wherein the learning from the partial photo product design further includes learning from the received additional user selections of the one or more photos and the positions for placement of the one or more photos on the second page.

20. A system for creating a photo product, the system comprising:
a data storage device for storing data; and
a processor that executes the data to cause the system to:
receive user selections of one or more photos and positions for placement of the one or more photos on a first page of a whole photo product design;
generate, based on the received user selections, a partial photo product design of the whole photo product design that includes the first page with the one or more photos placed at the positions on the first page;
provide the partial photo product design as machine learning input;
automatically generate and provide as machine learning output a plurality of selectable design options for at least one other page included in a remaining photo product design of the whole photo product design, wherein each of the plurality of selectable design options has at least one of different photos and different positions for placement of photos on the other page, and the plurality of selectable design options are generated based on learning from the partial photo product design, including learning from the received user selections of the one or more photos and the positions for placement of the one or more photos on the first page;
receive a selection of one of the plurality of selectable design options;
include the selected design option for the other page in the remaining photo product design of the whole photo product design; and
automatically make a physical photo product based at least in part on the whole photo product design.

21. A computer-readable non-transitory memory storing data that, when executed by a processor of a computer, causes the computer to:
receive user selections of one or more photos and positions for placement of the one or more photos on a first page of a whole photo product design;
generate, based on the received user selections, a partial photo product design of the whole photo product design that includes the first page with the one or more photos placed at the positions on the first page;
provide the partial photo product design as machine learning input;
automatically generate and provide as machine learning output a plurality of selectable design options for at least one other page included in a remaining photo product design of the whole photo product design, wherein each of the plurality of selectable design options has at least one of different photos and different positions for placement of photos on the other page, and the plurality of selectable design options are generated based on learning from the partial photo product design, including learning from the received user selections of the one or more photos and the positions for placement of the one or more photos on the first page;
receive a selection of one of the plurality of selectable design options;
include the selected design option for the other page in the remaining photo product design of the whole photo product design; and
automatically make a physical photo product based at least in part on the whole photo product design.

\* \* \* \* \*